United States Patent [19]
Ané et al.

[11] 3,788,352
[45] Jan. 29, 1974

[54] FLOW LIMITER

[75] Inventors: Jean-Pierre Ané, Jouy-en-Josas; Jean-Paul Teillard, Malakoff; Emile Quere, Charenton, all of France

[73] Assignee: Societe Nationale Industrielle Aerospatiale, Paris, France

[22] Filed: Nov. 6, 1972

[21] Appl. No.: 303,836

[30] Foreign Application Priority Data
Nov. 12, 1971 France .................... 7140663

[52] U.S. Cl............. 137/523, 137/540, 137/513.5, 251/122, 251/251
[51] Int. Cl............................................ F16k 17/00
[58] Field of Search ... 91/443; 137/513.5, 523, 540; 251/82, 83, 122, 213, 251

[56] References Cited
UNITED STATES PATENTS

| | | | |
|---|---|---|---|
| 1,766,648 | 6/1930 | Keller | 91/443 X |
| 1,770,909 | 7/1930 | Brooks | 137/540 X |
| 2,991,800 | 7/1961 | Becker | 251/122 X |
| 2,680,453 | 6/1954 | Prijatel | 137/540 X |

*Primary Examiner*—William R. Cline
*Attorney, Agent, or Firm*—Karl W. Flocks

[57] ABSTRACT

Precision flow limiter in which a single hydraulic conduit contains a non-return valve urged against its seat by a spring, while an adjusting screw having a tapering ramp is adapted to cooperate with an axial abutment of said valve whereby to space the latter from its seat as required and accurately adjust the throttled flow.

6 Claims, 4 Drawing Figures

FLOW LIMITER

The present invention relates to a flow limiter and more particularly to a hydraulic throttling valve providing fine adjustment of the flow by the progressive cooperation of a tapering ramp with the thrust cone of a slide-valve which is elastically urged towards its shut-off seat.

Already known are flow limiters having a single axial conduit, in which a valve formed with a calibrated orifice is urged against its seat by a spring. The oil flow is unrestrained in one direction and limited to a predetermined unvariable level in the other direction, it being necessary to remove and change the valve in order to modify the flow rate provided by the calibrated orifice.

Likewise known are flow limiters in which two intercommunicating parallel-drilled conduits, one of which contains a check-ball and the other a slide, the position of which is externally adjustable in relation to its abutment seat in order to permit modifying the throttled hydraulic flow as required. However, the design of the body of such limiters calls for a plurality of internal drillings for which plugs must be provided afterwards on the finished product, and the accuracy of adjustment of the flow leaves something to be desired because of the backlash in the screw threads; moreover, manufacture involves considerable waste of material and man-hours.

The present invention accordingly provides a precision flow limiter in which a single hydraulic conduit contains a non-return valve urged against its seat by a spring, while an adjustment screw having a tapering ramp is adapted to cooperate with an axial abutment of said valve whereby to space the latter from its seat as required and accurately adjust the throttled flow.

Further advantages and particularities will emerge from the description which follows of a non-limitative exemplary embodiment of the invention, given with reference to the accompanying drawings, in which:

FIG. 1 shows in partial section a flow limiter according to the invention;

FIG. 2 schematically illustrates a detail thereof on an enlarged scale;

Figure 1:
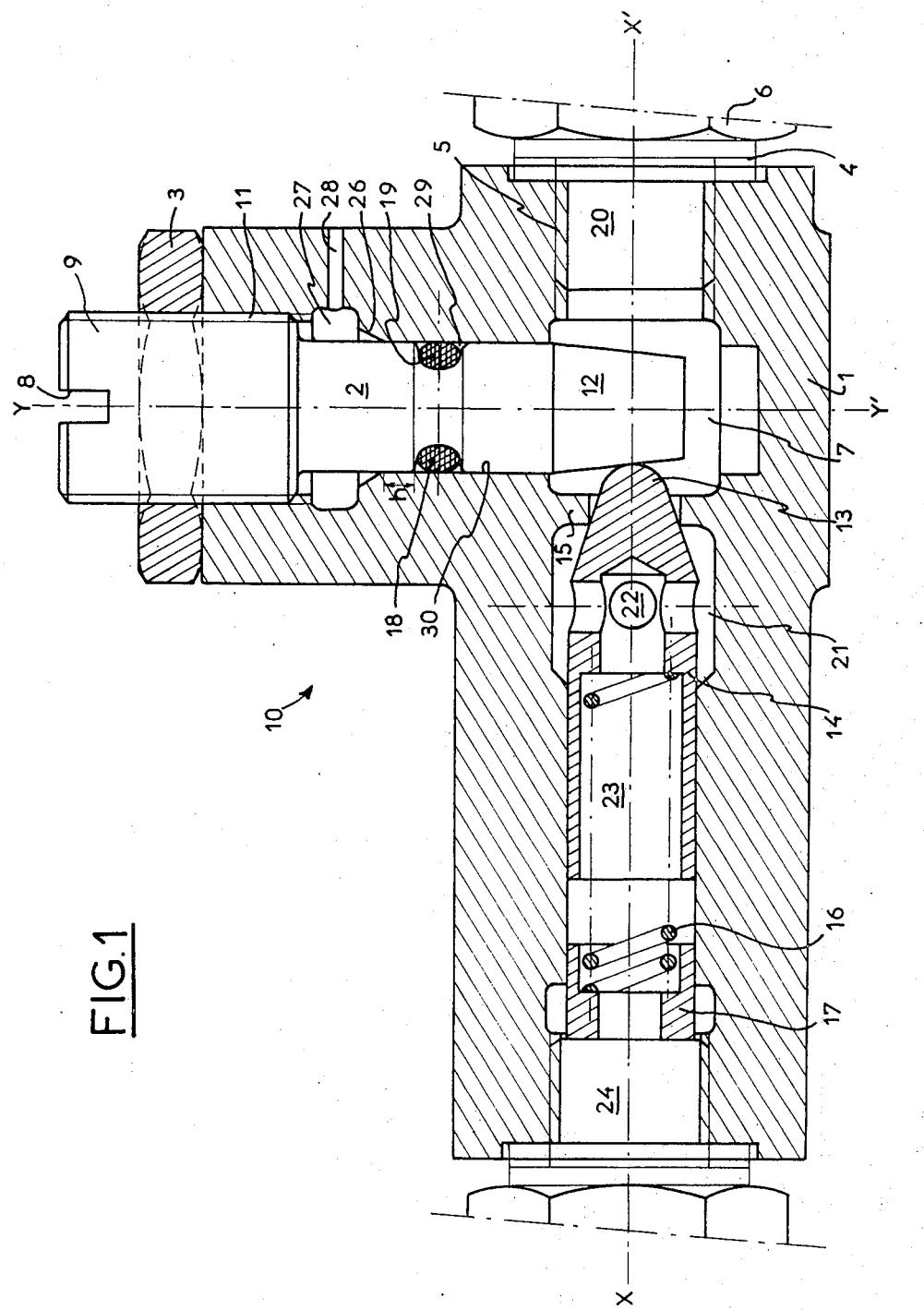

Reference to FIG. 1 shows a flow limiter according to the invention in which a body 10, made of cadmium-plated steel for example, is formed with an axial conduit 1 for the throttled hydraulic fluid. A blind hole 30 of axis YY' extending at right angles up to the main axis XX' of said conduit receives therein an adjustment screw 2 which can be locked in the selected position by a locknut 3.

The fluid is allowed to flow freely in the direction of arrow f1, whereas in the opposite direction f2 the throttling of the flow is precisely controlled in accordance with the invention.

A union 4 screws into a capped hole 5 at each end of conduit 1 and has a hydraulic fluid pipe 6 sealingly connected thereto.

Formed within conduit 1 is an adjustment chamber 7 into which adjustment screw 2 has port at right angles to axis XX'. The head of screw 2 is slotted at 8 to enable it to be moved along axis YY' by the rotation of head 9 through a screw-thread 11 formed in the hole 30.

Screw 2 terminates inside chamber 7 in a frusto-conical portion 12 against which is adapted to abut the taper end 13 of a slide-valve proper 14 urged elastically against its seat 15 by means for example of a coil spring 16 inserted into a thrust cap 17.

When the hydraulic system is under pressure, an O-ring 18 engaged into a groove 19 formed around the body of screw 2 ensures fluid tightness between chamber 7 and the exterior of the hole 30.

When hydraulic fluid is driven under pressure in the direction f1, it flows through passage 20 and chamber 7, moves valve 14 away from its seat against the countering force of valve spring 16, flows into a throttling chamber 21 and thence via calibrated radial orifices 22 into axial passage 23 of slide-valve 14 and thereafter into outlet passage 24.

Figure 2:
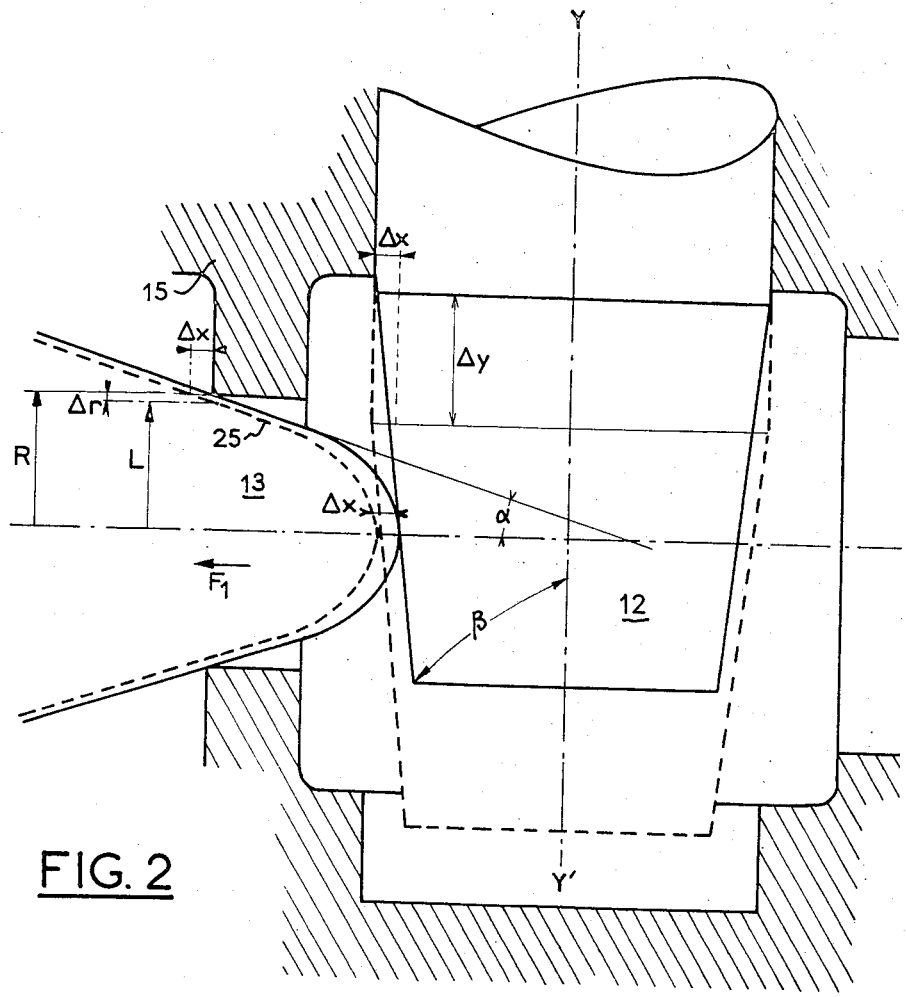
Figure 3:
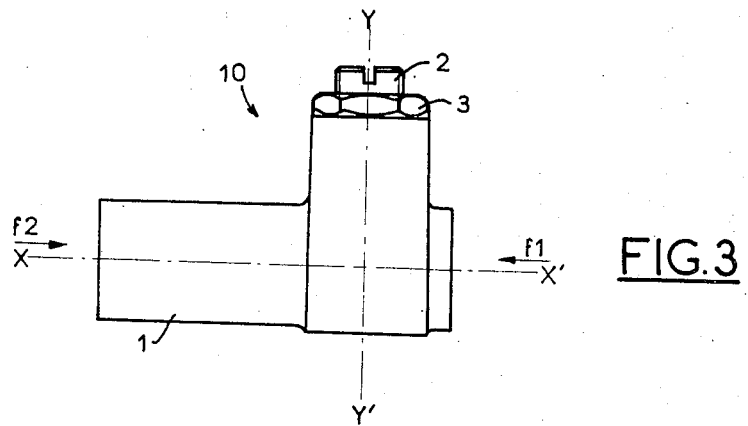
FIG. 3 depicts on a smaller scale the body of the flow limiter of FIG. 1.

When the direction in which the hydraulic pressure is exerted is reversed, slide-valve 14 moves back against its seat 15. Depending however on the position of adjustment screw 2 along its axis YY', the taper end 13 may abut against the frusto-conical surface of portion 12, as shown in dash lines in FIG. 2.

Calculations show that for an apex angle $\beta$ of frusto-conical portion 12 and a shift $\Delta_y$ of screw 2, the valve will be moved back through a distance $\Delta_x = \Delta_y \tan \beta$, against the countering force of the return spring. The width of the resulting annular gap between seat 15 and the side of the tapering valve portion 25 will be given by:

$$\Delta_r = \Delta_x \tan \alpha = \Delta_y \tan \beta \tan \alpha$$

If $p$ is the pitch of screw 2 at 11 and $n$ the number of rotations imparted to slot 8 in order to shift the screw through $\Delta_y = p\, n$, then one obtains the relation:

$$\Delta_r = p\, n \tan \beta \tan \alpha$$

so that the annular section of the passage offered to the hydraulic fluid is given by:

$$S = \pi R^2 - \pi (R - \Delta r)^2$$
$$= \pi (2 R \Delta_r - \Delta r^2)$$
$$= \pi (2 R p n \tan \beta \tan \alpha - p^2 n^2 \tan^2 \beta \tan^2 \alpha)$$

By adopting the following numerical values:

$$2R = 5.6$$
$$P = 0.5$$
$$\tan \beta = 0.05$$
$$\tan \alpha = 0.365$$

one obtains an annular area of:

$$S = 0.16009\, n - 0.00026015\, n^2$$

The section $S$ offered by the flow limiter to passage of the fluid is thus a linear function of the position of the screw if one neglects the quadratic term in the equation.

It is possible to calculate the maximum relative error one may incur by assuming that $S$ is proportional to $n$. If the adjustment screw has a maximum travel of 4 mm for eight complete revolutions, the quadratic term assumes the value:

$$0.00026015 \times 8 \times 8 = 0.01664\ mm^2$$

which corresponds to a value for $S$ of:

$$0.16009 \times 8 - 0.01664 = 1.264 \text{ mm}^2$$

so that the relative error is no more than:

$$0.01664/1.264 = 1.32\%.$$

Figure 4:
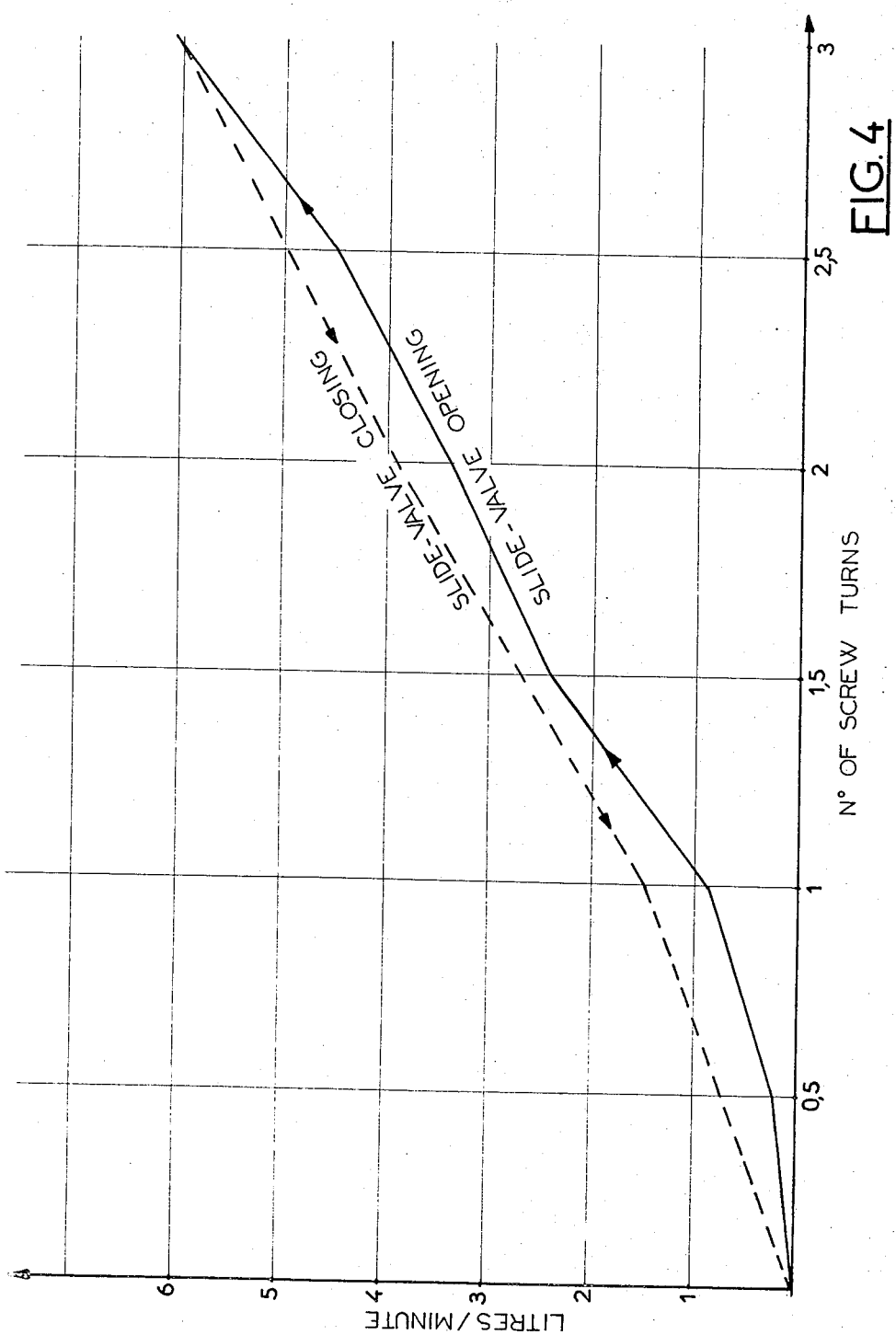
FIG. 4 is a graph showing the pattern of variation of the throttled flow.

The graph plotted in FIG. 4 for the case of a test at 160 kg/cm² shows that the plot is substantially straight and allows metering the throttled flow with as much accuracy as may be necessary. It will be appreciated that the dual demultiplication factor with two parametric degress tan $\beta$ and tan $\alpha$ makes it possible to carry the degree of sensitivity of the adjustement as far as may be desired.

Reference to the sectional view in FIG. 1 shows that at a distance "$h$" above O-ring 18 is a flared portion 26 leading into a chamber 27 into which has port a bleed passage 28. Flared portion 26 helps to guide screw 2 into hole 30 when assembling the unit, but above all provides emergency communication between groove 29 and chamber 27 in the event that only the last screw-threads are inadvertently left in engagement.

In that case a small-diameter jet of hydraulic fluid through bleed 28 warns the operator that the adjustment screw is in its outermost position, before it is expelled from its hole violently and perhaps dangerously by the hydraulic fluid.

Precision of adjustment, fluidtightness and long valve life depend on the resistance to wear of the screw and valve portions in contact, 12 and 13 respectively. In accordance with the invention, therefore, the slide-valve 14 and the adjustment screw are surface-hardened, at least over their surfaces in mutual contact, by case-hardening the portions 12, 13 and 25. The case-hardening over these areas have a depth, say, of 0.3 mm. A final phosphating process may then be used to corrosion inhibit the items.

It goes without saying that changes and substitutions of parts may be made in the preferred non-limitative exemplary embodiment hereinbefore described, without departing from the scope of the invention as set forth in the appended claims.

We claim:

1. A flow limiter with hydraulic throttling valves, including a body formed with an axial conduit, a throttling slide-valve positioned for reciprocation within and along the axis of said conduit, adjustment chamber, a seat for said slide-valve provided at the entrance of said chamber, a resilient means biasing said throttling slide-valve to a closed position against said seat, said slide-valve having a conical bearing surface urged against said seat by said resilient means with a portion extending through said seat into said adjustment chamber, and an adjustment screw inserted into said chamber at right angle to the axis of said conduit, said adjustment screwing having a camming surface contacting said slide-valve portion, said slide-yalve being lifted off its seat by the pressure of a hydraulic fluid in said adjustment chamber whereby to permit free flow of the fluid in one direction, movement of said adjustment screw along its axis at right angles to the axis of the conduit allowing of setting a slide-valve limit return position when the direction of flow is reversed, said limit return position opening a passageway of annular section between the slide-valve and its seat.

2. A flow limiter according to claim 1, in which said adjustment screw is formed with a frusto-conical camming surface, said slide-valve portion which penetrates into said adjustment chamber having an ogival tip adapted to abut against said frusto-conical camming surface.

3. A flow limiter according to claim 1, in which the bearing surfaces of the slide-valve and the adjustment screw are made of case-hardened steel.

4. A flow limiter according to claim 1 comprising a throttling chamber formed in said conduit, and in which said slide-valve is formed with a blind axial opening therein which has port through calibrated radial orifices in said throttling chamber.

5. A flow limiter according to claim 1, comprising a bleed chamber, a hole for receiving said adjustment screw formed with a recess having a flared wall leading into said bleed chamber.

6. A flow limiter according to claim 5, in which said adjustment screw is formed with a groove adapted to receive an O-ring up-stream to said recess and said bleed chamber.

* * * * *